United States Patent
Grözinger et al.

[11] 3,984,714
[45] Oct. 5, 1976

[54] ARRANGEMENT FOR HOLDING WINDINGS ON POLE CORES

[75] Inventors: Dieter Grözinger, Echterdingen; Rainer Schilling, Stuttgart, both of Germany

[73] Assignee: Robert Bosch G.m.b.H., Stuttgart, Germany

[22] Filed: Aug. 25, 1975

[21] Appl. No.: 607,836

[30] Foreign Application Priority Data
Aug. 28, 1974 Germany............................ 2441175

[52] U.S. Cl................................. 310/194; 310/43
[51] Int. Cl.² ......................................... H02K 19/26
[58] Field of Search ............ 310/194, 184, 91, 179, 310/185, 180, 186, 187, 188, 192, 193, 214, 216, 217, 218, 42, 43, 89, 258, 260; 336/185, 208

[56] References Cited
UNITED STATES PATENTS

| | | | |
|---|---|---|---|
| 2,443,455 | 6/1948 | Herman | 310/214 |
| 3,493,801 | 2/1970 | Walser | 310/186 |
| 3,768,152 | 10/1973 | Swanke | 310/43 |
| 3,875,436 | 4/1975 | MacFarland | 310/89 |
| 3,932,929 | 1/1976 | Hallerback | 310/43 |

*Primary Examiner*—R. Skudy
*Attorney, Agent, or Firm*—Michael J. Striker

[57] ABSTRACT

An electric machine, particularly a miniature electric motor, includes a stator structure provided with at least one pair of main poles and at least one pair of auxiliary poles, the auxiliary poles alternating with the main poles. Each main pole is comprised of a main pole core and a main pole winding on the respective main pole core. Each auxiliary pole is comprised of an auxiliary pole core and an auxiliary pole winding on the respective auxiliary pole core. A holding arrangement holds the auxiliary pole windings in place on the auxiliary pole cores and includes holding fingers extending in direction parallel to the axis of the stator structure into the intermediate spaces between adjoining main and auxiliary pole windings, and furthermore includes a holding ring to which the holding fingers are connected at one end, the holding ring lying against one axial side of the stator structure.

8 Claims, 4 Drawing Figures

ARRANGEMENT FOR HOLDING WINDINGS ON POLE CORES

BACKGROUND OF THE INVENTION

The invention relates to an arrangement for holding auxiliary or commutating windings in place on the pole cores of auxiliary poles, for example commutating poles in the stators of electric machines, particularly miniature motors.

In a known commutation pole machine, in whose stator four windings are arranged, the windings of the main poles are held in their respective positions by pole shoes arranged on the respective pole cores. The windings of the auxiliary poles--i.e., the commutation poles--for reasons of space cannot be mounted on the commutation pole cores in the same manner as the windings of the main poles. For this reason the pole cores of the commutation poles are made with a cross-section which is constant over their whole lengths. In this way, commutation pole windings, for example wound in holding cases, can be slid over the commutation pole cores relatively easily. Because the commutation pole cores are not provided with pole shoes of a configuration which would inherently tend to keep the associated pole windings in proper position, the commutation pole windings are held in place on their associated cores by separate holding means. In particular, use is made of little plates which in a clamp-like or clip-like manner hook into grooves in the commutation pole cores and under the pole shoes of the main poles. Their assembly is complicated and expensive. Use of the known holding means in the case of miniature motors is impractical because of the small dimensions involved and the difficulty of manipulating the small holding members.

SUMMARY OF THE INVENTION

It is accordingly an object of the invention to provide a holding arrangement of the general type in question for simply and securely holding windings in place on associated pole cores in the stator of an electric machine, particularly a miniature electric motor.

This object, and others which will become more understandable from the description, below, of a preferred embodiment, can be met, according to one advantageous concept of the invention, by inserting into the intermediate spaces between the windings of the main and auxiliary poles holding fingers extending generally parallel to the stator axis and connected at one end to a holding ring which abuts against one axial end face of the stator.

This has the advantage that the windings associated with all the auxiliary poles are held in their proper respective positions by a single holding arrangement. Furthermore, the holding arrangement is not structurally connected with the pole cores, as a result of which these can be made of smaller dimensions than otherwise. This in turn has a beneficial effect upon the size of the electric motor as a whole. Additionally, the inventive holding arrangement can be assembled with the other parts of the electric machine, particularly the windings for the auxiliary poles, in an extremely simple way.

Advantageously, holding fingers are located to both sides of each commutation pole winding, considered in direction circumferentially of the stator. Experience has proved it to be advantageous to make the holding fingers of rectangular cross-section, and to so dimension and dispose them that each holding finger physically touches the windings of the associated main and commutation poles at at least one respective location along the length of the finger.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
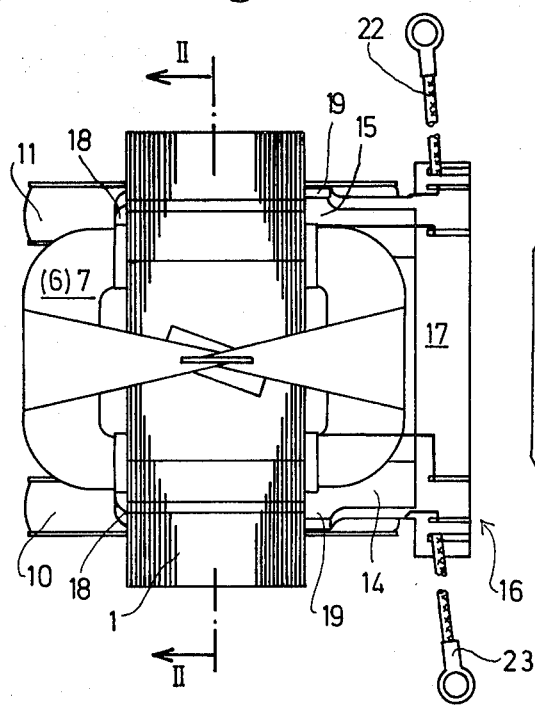
FIG. 1 is a side view of the stator structure of a universal motor.
Figure 2:
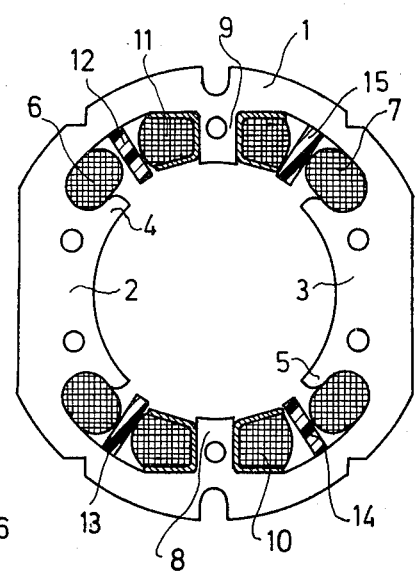
FIG. 2 is a section taken along line II—II in FIG. 1.

In FIGS. 1 and 2, there is depicted a field magnet formed of a plurality of ferromagnetic plates and forming the stator structure 1 of a universal motor. Projecting into the interior of stator structure 1 are the two main poles 2, 3 of the stator. These have cores provided with salient pole shoes 4, 5. The cores of the main poles 2, 3 in per se known manner carry main windings 6, 7 which are held in position by the pole shoes 4, 5. In the neutral zone between the main poles 2, 3 there are arranged in the interior of stator structure 1 commutation poles 8, 9. The cores of the commutation poles 8, 9 are not provided with salient pole shoes, and the cross-sectional configuration of the cores of the commutation poles 8, 9 is approximately constant along their entire lengths. Each commutation pole core carries a respective commutation pole winding 10 or 11, held in a respective coil-holding case for convenience of assembly.

Figure 3:
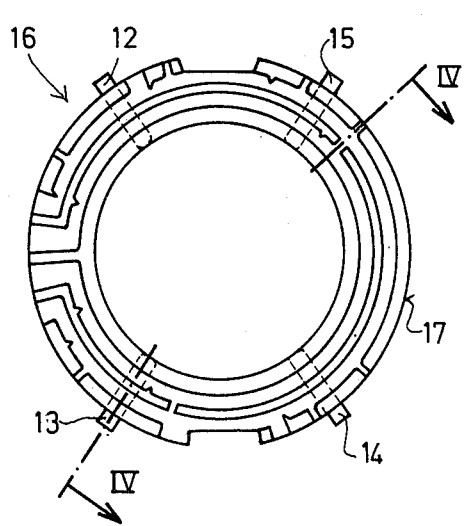
FIG. 3 depicts separately the holding arrangement 16 of FIGS. 1 and 2, for holding in place on their respective cores the windings of the commutation poles.
Figure 4:
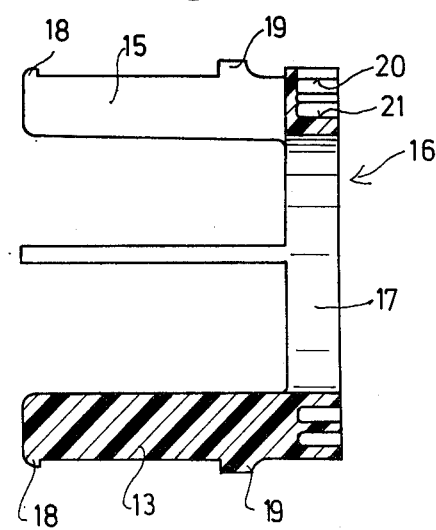
FIG. 4 is a section taken along line IV—IV in FIG. 3.

In the intermediate spaces between the main windings 6, 7 and the commutation pole windings 10, 11 there are inserted holding fingers 12, 13, 14, 15 of a holding arrangement 16 for holding the commutation pole windings in place. The holding fingers of the holding arrangement extend generally parallel to the axis of the stator. The holding arrangement 16 for holding the commutation pole windings is separately depicted in FIGS. 3 and 4. The fingers 12, 13, 14, 15 are arranged on a holding ring 17 which lies against the front side of the stator structure 1. Considered in direction circumferentially of the stator structure 1, a finger 12, 13 14 or 15 is located to either side of each auxiliary pole winding 10 or 11. Each finger 12, 13, 14 or 15 contacts one of the facing sides of the associated main and commutation pole windings at at least one respective location along the length of the finger. As can be seen from FIGS. 2 and 3, the fingers 12, 13, 14, 15 have a rectangular cross-section. The space between the fingers 12, 15 narrows in radially inwards direction. As a result, the two fingers 12, 15 hold the associated encased commutation pole winding 11 in position between them. Likewise, the space between the fingers 13, 14 narrows in radially inwards direction, so that the two fingers 13, 14 hold the associated encased commutation pole winding 10 in position between them.

Each finger 12, 13, 14, 15, at the end thereof remote from the holding ring 17, is provided with a radially outwardly projecting nose 18 which hooks behind that axial end face (the left end in FIG. 1) of the stacked-plate stator structure 1 which faces away from the holding ring 17. Each finger 12, 13, 14, 15, near the end thereof connected to the holding ring 17, is provided with a radially outwardly projecting shoulder 19 which abuts against that axial end face of the stacked-plate stator structure 1 which faces towards the holding ring 17. The distance between the nose 18 and shoulder 19 on any of the fingers 12, 13, 14, 15, measured along the length of the respective finger, is only slightly greater than the axial length of the field magnet stator structure 1.

The holding ring 17, at the side thereof (right side in FIG. 4) facing away from the fingers 12, 13, 14, 15, is provided with two annular recesses 20, 21. Inserted into these recesses 20, 21 are connecting wires 22, 23, as well as the weld joints at which the connecting wires 22, 23 are welded to the wires of the pole windings. To fix the connecting wires 22, 23 securely in place, the recesses 20, 21 are filled with a cast and then cured body of synthetic plastic material, for example a cured resin.

The assembly of the holding arrangement 16 in the stator 1 is performed, subsequent to the pushing into place of the encased commutation pole windings 10, 11, in such a manner that the fingers 12, 13, 14, 15 are elastically squeezed towards each other to such an extent that the noses 18 can be just inserted into the interior of the stator structure 1. The holding arrangement 16 is then pushed axially into the interior of the stator structure 1 until the noses 18 move past the far axial end of the stator structure 1, whereupon the fingers 12, 13, 14, 15 resiliently spring radially outwards back to their original positions, causing the respective noses 18 to hook behind the far axial end of the stator structure 1. The near axial end (right end as viewed in FIG. 1) of the stator 1 is abutted against by the shoulders 19, so that holding arrangement 16 is held in place on the stator packet 1 by means of the four noses 18 and the four shoulders 19, in a clip-like or snap-action manner.

In the illustrated exemplary embodiment, the entire holding arrangement 16, including both the holding ring 17 and the fingers 12, 13, 14, 15, is made of a single piece of molded synthetic plastic material. However, the holding arrangement 16 could be made of other material, for example the hard paper known under the trade name "Pertinax".

It will be understood that each of the elements described above, or two or more together, may also find a useful application in other types of constructions differing from the types described above.

While the invention has been illustrated and described as embodied in a miniature universal motor, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an electric machine, particularly a miniature electric motor, in combination, a stator structure provided with at least one pair of main poles and at least one pair of auxiliary poles, the auxiliary poles alternating with the main poles, each main pole being comprised of a main pole core and a main pole winding on the respective main pole core, and each auxiliary pole being comprised of an auxiliary pole core and an auxiliary pole winding on the respective auxiliary pole core; and a holding arrangement for holding the auxiliary pole windings in place on the auxiliary pole cores comprising holding fingers extending in direction parallel to the axis of the stator structure and into the intermediate spaces between adjoining main and auxiliary pole windings, and a holding ring to which the holding fingers are connected at one end, said holding ring lying against one axial side of the stator structure.

2. In an electric machine as defined in claim 1, wherein said holding arrangement includes holding fingers located to both sides of each auxiliary pole winding, considered in direction circumferentially of the stator.

3. In an electric machine as defined in claim 1, wherein said holding fingers are of rectangular cross-section, and wherein each holding finger contacts the adjoining main and auxiliary pole windings at at least one respective location along the length of the respective holding finger.

4. In an electric machine as defined in claim 1, wherein the holding fingers at the ends thereof remote from the holding ring are provided with outwardly projecting noses which hook behind that axial end of the stator structure which faces away from the holding ring.

5. In an electric machine as defined in claim 4, wherein the holding fingers at the ends thereof to which is connected the holding ring are provided with outwardly projecting shoulders, the distance between the nose and shoulder on each holding finger being slightly greater than the axial length of the stator structure, with the stator structure fitting between the noses and shoulders of the holding fingers.

6. In an electric machine as defined in claim 1, wherein the holding ring at the axial end thereof which faces away from the holding fingers is provided with annular recesses for accommodating connecting wires connected to the wires of the windings.

7. In an electric machine as defined in claim 1, wherein the holding arrangement including both the holding ring and the holding fingers is made of synthetic plastic, electrically insulating material.

8. In an electric machine as defined in claim 1, wherein the holding arrangement including both the holding ring and the holding fingers is a single piece of molded synthetic plastic, electrically insulating material.

* * * * *